United States Patent [19]

Recker et al.

[11] Patent Number: 5,191,518
[45] Date of Patent: Mar. 2, 1993

[54] PLURAL INVERTER CONTROL ARRANGEMENT

[76] Inventors: Bradley J. Recker, 5281 Pepper Dr., Rockford, Ill. 61111; Derrick Roe, 3385 Quiet Valley La., Rockford, Ill. 61109

[21] Appl. No.: 745,425

[22] Filed: Aug. 15, 1991

[51] Int. Cl.⁵ .................. H02M 1/08; H02M 1/12
[52] U.S. Cl. ............................. 363/71; 363/41; 363/98
[58] Field of Search ............... 363/41, 43, 64, 71, 363/97, 98

[56] References Cited

U.S. PATENT DOCUMENTS

| | | | |
|---|---|---|---|
| 3,943,429 | 3/1976 | Heintze | 363/71 |
| 4,802,079 | 1/1989 | Mizoguchi | 363/71 |
| 4,866,591 | 9/1989 | Cook et al. | 363/67 |
| 4,882,120 | 11/1989 | Roe et al. | 363/98 |
| 4,905,117 | 2/1990 | Beg | 361/93 |

Primary Examiner—Emanuel T. Voeltz
Attorney, Agent, or Firm—Marshall, O'Toole, Gernstein, Murray & Bicknell

[57] ABSTRACT

An inverter arrangement for converting DC to AC having a first inverter with an input for receiving DC and an output for providing a first inverter output, a second inverter having an input for receiving DC and an output for providing a second inverter output, an AC output circuit having a first input for receiving the first inverter output, a second input for receiving the second inverter output, and an AC output for providing AC based upon the first inverter output and the second inverter output, and a controller for controlling the first inverter to minimize DC content in a first inverter output, and for controlling the second inverter output based upon DC content between the first inverter output and the second inverter output to minimize DC content in the second inverter output.

17 Claims, 10 Drawing Sheets

PLURAL INVERTER CONTROL ARRANGEMENT

BACKGROUND OF THE INVENTION

The present invention relates to an inverter arrangement for supplying an AC output from DC input, and more particularly, to an arrangement including both a first inverter and a second inverter for supplying an AC output with minimal DC content.

Power inverters have long been used to convert DC power into AC power for energizing one or more AC loads. Typically, such inverters include switches such as transistors which are controlled in pulse width modulation (PWM) operating mode to produce a PWM waveform comprising a series of pulses and notches. The waveform is converted into a sinusoidal output waveform by a filter which is coupled to the inverter output. Such an inverter may be used as part of a variable speed constant frequency (VSCF) power generating system in which a generator is driven by a variable-speed prime mover to produce variable frequency AC power which is rectified, filtered, and applied to the inverter as DC power over a DC link.

Ideally, the inverter controller should operate the inverter switches to minimize DC content in the inverter output. U.S. Pat. No. 4,882,120 discloses a system for controlling an inverter in such a way that DC content in its output is minimized.

The system in that patent uses a single inverter stage for inverting DC input into AC output. A single stage inverter requires the inverter switches to be able to manage large amounts of power. If a second inverter is added to a first inverter and is also controlled in such a way as to minimize harmonic content in its output, the inverter switches of the second inverter can share power with the inverter switches of the first inverter thus reducing the amount of power that any one switch must control which in turn can lead to a lowering of the power rating of the inverter switches. Furthermore, it is possible to control the second inverter so that additional harmonics are eliminated which results in less filtering resulting in turn in less filter weight. Under certain conditions, the savings in filter weight exceeds the weight added by the second inverter such that the overall weight of the system is reduced. Weight reduction is important when inverter systems are used in certain applications such as on aircraft.

SUMMARY OF THE INVENTION

Accordingly, the present invention adds a second inverter to a first inverter such that the first and second inverters invert DC power for providing AC output power wherein the first and second inverters are controlled in such a way as to minimize DC content in their outputs.

The first inverter can be controlled so as to minimize the DC content between each phase of a multiphase output and neutral and the second inverter can be controlled to minimize DC content between each of its phase outputs and the corresponding phase outputs of the first inverter.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
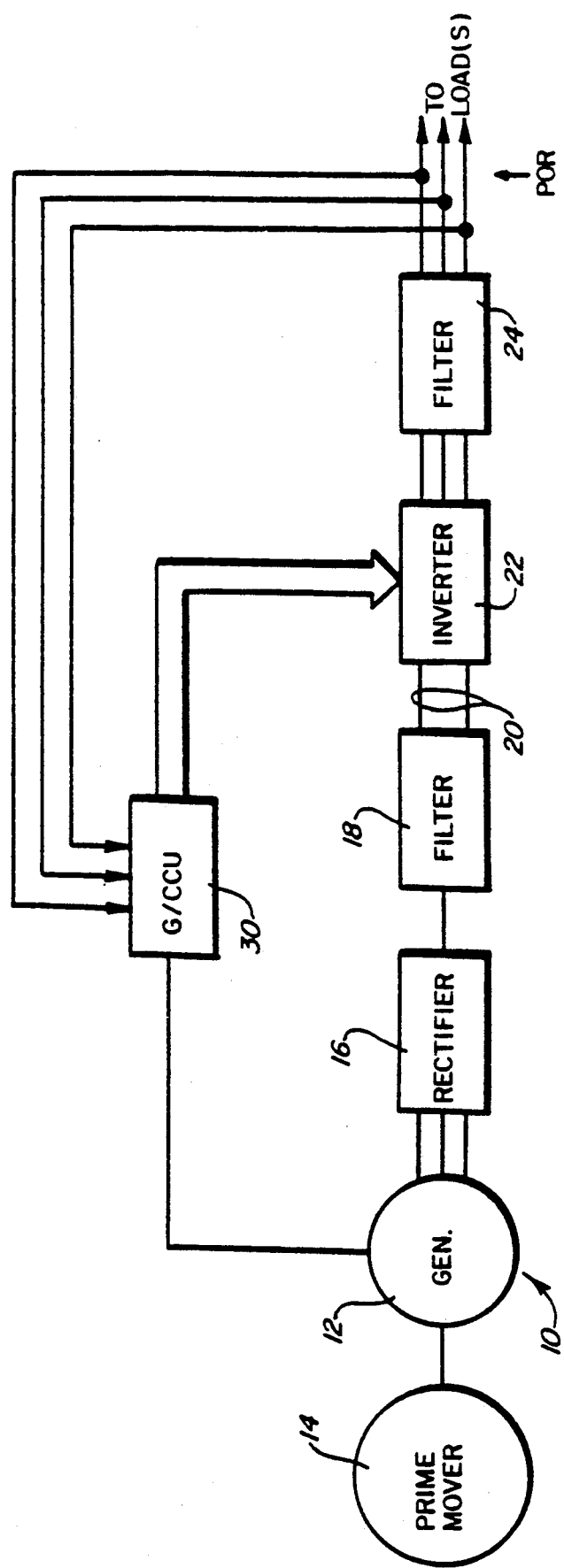
FIG. 1 is a system overview of a VSCF system which can incorporate the present invention.

In FIG. 1, a variable speed constant frequency (VSCF) system 10 is illustrated. VSCF system 10 includes brushless, synchronous generator 12 driven by variable speed prime mover 14 which may be, for example, a jet engine. The generator develops a polyphase, variable frequency AC output which is converted into DC power by rectifier 16 and filter 18. The resulting DC power is provided over DC link 20 to inverter system 22 which converts the DC power into constant frequency AC power. This AC power is filtered by filter 24 and provided to one or more AC loads.

Inverter system 22 is controlled by generator/converter control unit or G/CCU 30. G/CCU 30 also controls the excitation of brushless generator 12 in accordance with the parameter of the output power developed at the point of regulation (POR). This function of the G/CCU is not necessary to an understanding of the invention and hence will not be described in greater detail.

Figure 2:
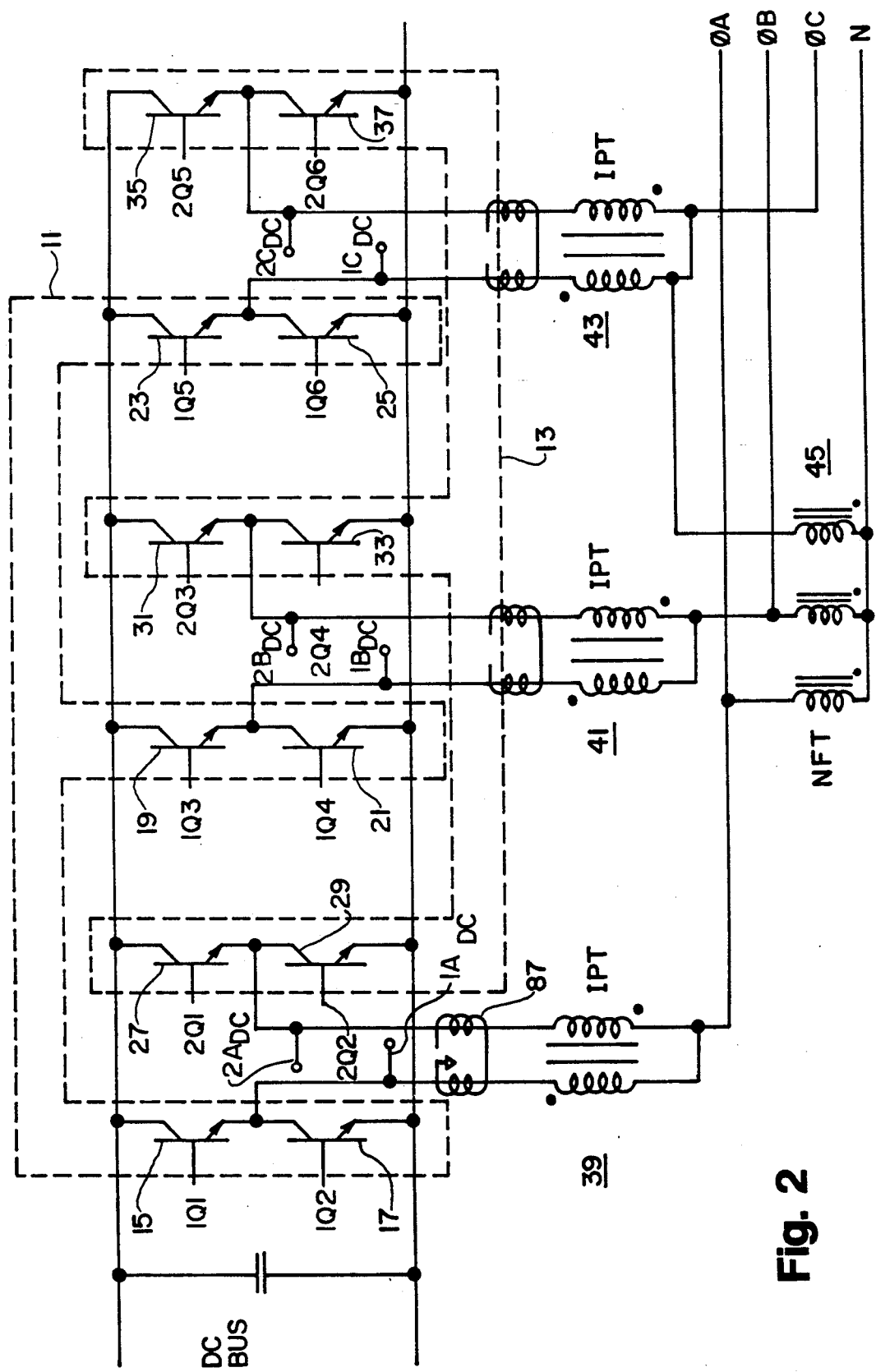
FIG. 2 shows the first and second inverters arranged for providing three-phase output power.

As shown in FIG. 2, inverter system 22 is comprised of first inverter 11 and second inverter 13. First inverter 11 has two switches 15 and 17 connected across the DC bus or link for supplying an output of a first inverter first phase, transistors 19 and 21 connected across the DC bus for providing an output of a first inverter second phase, and transistors 23 and 25 connected across the DC bus for supplying an output of a first inverter third phase.

Second inverter 13 has transistors 27 and 29 connected across the DC bus for providing an output of a second inverter first phase, transistors 31 and 33 connected across the DC bus for providing an output of a second inverter second phase, and transistors 35 and 37 connected across the DC bus for providing an output of a second inverter third phase.

The first phase outputs from each of the first and second inverters are connected through interphase transformer 39 to supply an AC output having an output AC first phase. The second phase outputs from each of the first and second inverters are connected through second interphase transformer 41 for providing an output AC second phase. The third phase outputs from each of the first and second inverters are connected through third interphase transformer 43 for providing an output AC third phase. Additionally, the outputs of all three interphase transformers 39, 41, and 43 are connected to neutral forming transformer 45 for supplying a neutral phase for the AC output.

Figure 3:
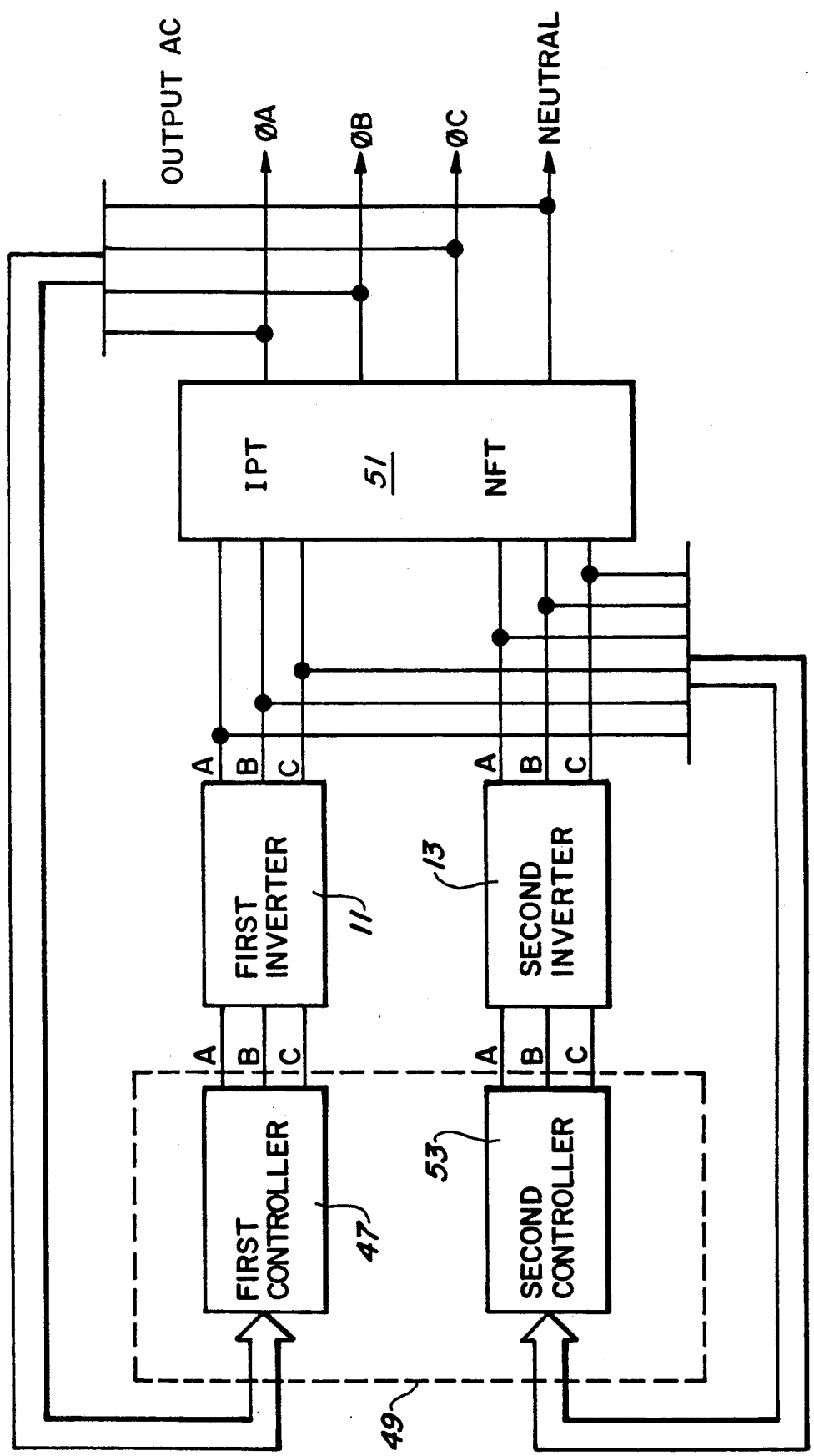
FIG. 3 shows a block diagram of a control system for controlling the inverters of FIG. 2.

FIG. 3 is a block diagram showing the control arrangement for first and second inverters 11 and 13. The three phases and the neutral phase of the output AC are fed back to controller 49 comprising first controller 47 and second controller 53. Specifically, the three phases and neutral fed back to the controller 49 are applied to first controller 47. The outputs from first inverter and second inverter 13 are fed back to controller 49 and are applied to second controller 53. First controller 47 is designed to control first inverter 11 such that the DC content in the output AC phases is minimized and second controller 53 is designed to control second inverter 13 in such a way that the DC content between corresponding phases in the outputs of the first and second inverters is minimized. The outputs from first inverter 11 and second inverter 13 are applied to the interphase transformer and neutral forming transformer 51 which in turn supplies the multiphase output AC.

Figure 4:
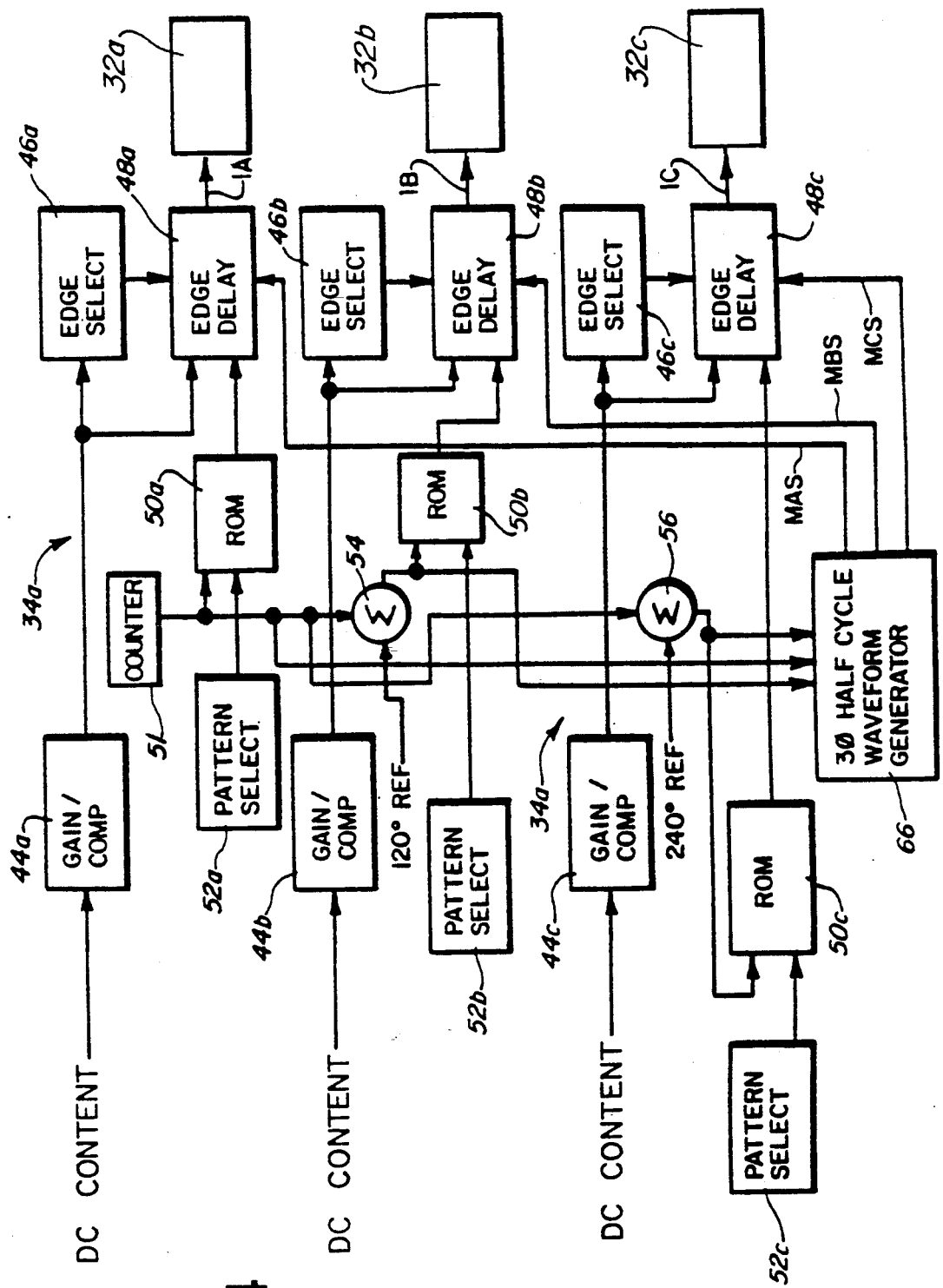
FIG. 4 is a block diagram of a controller which can be used for the controllers shown in FIG. 3.

FIG. 4 shows a controller which can be used for the first controller 47 and the second controller 53 it being understood that one circuit such as that shown in FIG. 4 would be used for the first controller 47 and a second such circuit would be used for second controller 53, each such circuit having the inputs as disclosed hereinbelow.

As shown in FIG. 4, the DC content signal (either the phase-to-neutral DC content signal in the case where the circuit shown in FIG. 4 is used as the first controller or the phase to corresponding phase DC content signal where the circuit shown in FIG. 4 is used as the second controller) is fed to gain and compensation units 44a-44c, each of which develops a digital word having 16 bits ADC0-ADC15 representing the required correction to inverter switching to in turn reduce DC content to a reference level which is typically zero. Specifically, the error between the DC content signal and the reference for one phase is applied to unit 44a, the error between the DC content signal and the reference for a second phase as applied to unit 44b and the error between the DC content signal and the reference for the third phase is applied to unit 44c.

Edge delay circuits 48a-48c develop the control signals which are provided to base drive and isolation circuits 32a-32c. Each edge delay circuit 48a-48c receives a pulse width modulated (PWM) waveform which is retrieved from a corresponding memory 50a-50c. Each memory 50a-50c includes high and low order address inputs which receive signals that determine the selection of the particular PWM waveform to be obtained from the memory and the phase and frequency of the retrieved waveform, respectively. The low order address inputs of the memory 50a receive the output of counter 51 which accumulates clock pulses. The high order address inputs of each of the memories 50a-50c receive signals developed by pattern select circuits 52a-52c to obtain a desired inverter output condition.

Counter 51 is coupled to summers 54 and 56 which in turn include outputs which are coupled to the low order address inputs of memories 50b and 50c. The summers 54 and 56 receive reference signals representing 120° and 240° phase displacements so that the outputs of the memories 50b and 50c are displaced by these amounts from the output of the memory 50a.

Representative pattern select circuitry for selecting appropriate PWM waveforms from the memories 50a-50c is disclosed and claimed in Recker et al. U.S. patent application Ser. No. 07/285,423, filed Dec. 16, 1988 entitled "Low Distortion Control for A VSCF System." Circuitry for maintaining the memory outputs at precise 120° displacements is disclosed and claimed in Rozman et al. U.S. patent application Ser. No. 07/285,118 filed Dec. 16, 1988, entitled "Phase Separation Control," and assigned to the assignee of the instant application. The disclosures of both of the foregoing patent applications are incorporated by reference herein. Also, copending application Ser. No. 07/745,413, filed Aug. 15, 1991 shows a way of displacing the first inverter output phases from the second inverter output phases so that additional harmonics can be minimized.

As noted in greater detail hereinafter, edge select circuits 46a-46c determine whether the rising or falling edges of the PWM waveforms are to be delayed and determine the length of such delay to implement a coarse DC content correction. In addition, edge select circuits 46a-46c ascertain which pulse edges are to be further delayed by time periods determined by the width of pulses developed by a clock. The edge delay circuits 48a-48c undertake the edge delay function to reduce the DC content in the inverter output.

The outputs from base drive and isolation circuits 32a, 32b, and 32c are connected to corresponding pairs of first inverter switches (or corresponding pairs of second inverter switches), it being understood that a set of base drive and isolation circuits would be provided for the switch pairs of each of the first and second inverters.

Figure 5:
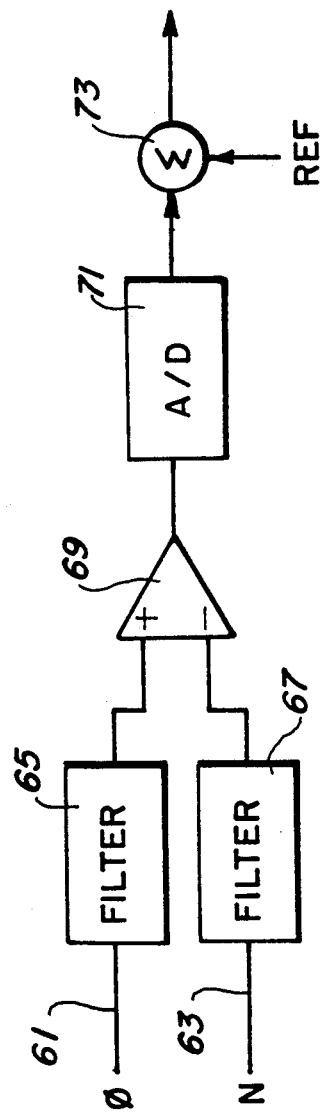
FIG. 5 is an arrangement for supplying an output phase-to-neutral DC content signal.

FIG. 5 shows a circuit arrangement for generating the phase-to-neutral DC content error signal (referred to above) for one phase of first controller 47, it again being understood that controller 47 would contain three such circuits, one for each output phase, with the outputs being supplied to a corresponding gain and compensation unit 44. The circuit of FIG. 5 has one input 61 connected to one phase of the output AC and second input 63 connected to the neutral phase. These signals are filtered by filters 65 and 67, respectively to pass through only the DC content of the signals on inputs 61 and 63. The outputs from filters 65 and 67 are applied to differential amplifier 69 which provides an output representing the difference in DC content between one of the output phases and neutral. The output from differential amplifier 69 is connected through A/D converter 71 to one input of summing junction 73 the other input of which receives a reference signal, typically zero. The reference establishes the allowable DC content difference between the phase and neutral. With the reference at zero, no DC content difference is allowed. The output from summing junction 73 is an , error signal which indicates DC content between the phase and neutral. The output from summing junction 73 is connected to a corresponding gain and compensating circuit 44. Alternatively, an integrator can be added between amplifier 69 and A/D converter 71 which would eliminate the need for summing junction 73. Also A/D converter 71 is not necessary where inverters 11 and 13 are controlled by analog rather than digital gate drivers.

Figure 6:
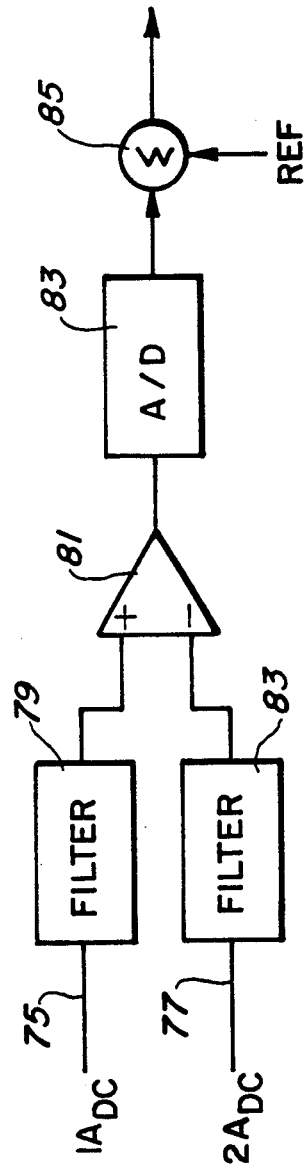
FIG. 6 shows an arrangement for providing DC content signals representing the difference between like phases of the first and second inverters.

FIG. 6 is a circuit which can be used for generating a phase to corresponding phase DC content error signal (referred to above) for one phase of second controller 53, it being understood that controller 53 would utilize three such circuits, one for each phase with the outputs being supplied to a corresponding gain and compensation unit 44 shown in FIG. 4. Second controller 53 in FIG. 3 would incorporate three such circuits as FIG. 6, one for each corresponding first and second inverter phase. For example, input 75 of FIG. 6 is connected to point $1A_{DC}$ shown in FIG. 2 and second input 77 is connected to point $2A_{DC}$ also shown in FIG. 2. A second circuit such as that shown in FIG. 6 would have a first input connected to point $1B_{DC}$ and a second input connected to point $2B_{DC}$ as shown in FIG. 2 and a third circuit would have a first input connected to point $1C_{DC}$ and a second input connected to $2C_{DC}$ also as shown in FIG. 2.

The voltage on input 75 is filtered by filter 79 to pass only DC content to one input of differential amplifier 81 and the voltage on input 77 is filtered by second filter 83 to pass only DC content to the other input of differential amplifier 81. Differential amplifier 81 provides an output representing the DC content difference between corresponding first inverter output and the second inverter output phases. This output is fed through A/D converter 84 to one input of summing junction 85, the other input of which receives the reference signal, typically zero. The output of summing junction 85 is connected to the input of corresponding gain and compensating circuit 44.

Figure 7:
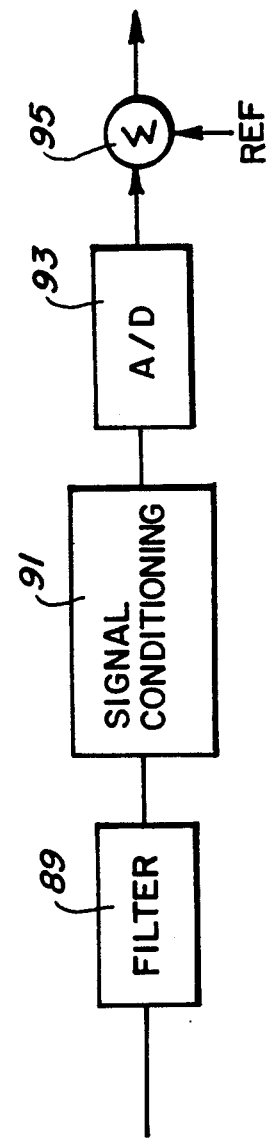
FIG. 7 shows an arrangement which can use current sensing instead of voltage sensing for supplying the first inverter phase to corresponding second inverter phase DC content signal.

Instead of sensing voltages at the first and second inverter outputs, current can be sensed as shown in FIG. 7. Thus, with respect to phase A, for example, current transformer 87 as shown in FIG. 2 provides an output which is filtered by filter 89 to pass only DC content. This DC content can be conditioned if desired by signal conditioning circuit 91 and supplied through A/D converter 93 to summing junction 95, the other input of which receives the reference. The output from summing junction 95 is connected to corresponding gain and compensating circuit 44.

In this manner, appropriate DC content signals can be generated for each of the phases controlled by first controller 47 and second controller 53. Thus, first inverter is controlled based upon DC content in the output AC to minimize DC content in the first inverter output and second inverter 13 is control based upon DC content between corresponding first and second inverter output phases for controlling the DC content in the output of the second inverter. Consequently, the DC content in the output AC is minimized.

Figure 8:
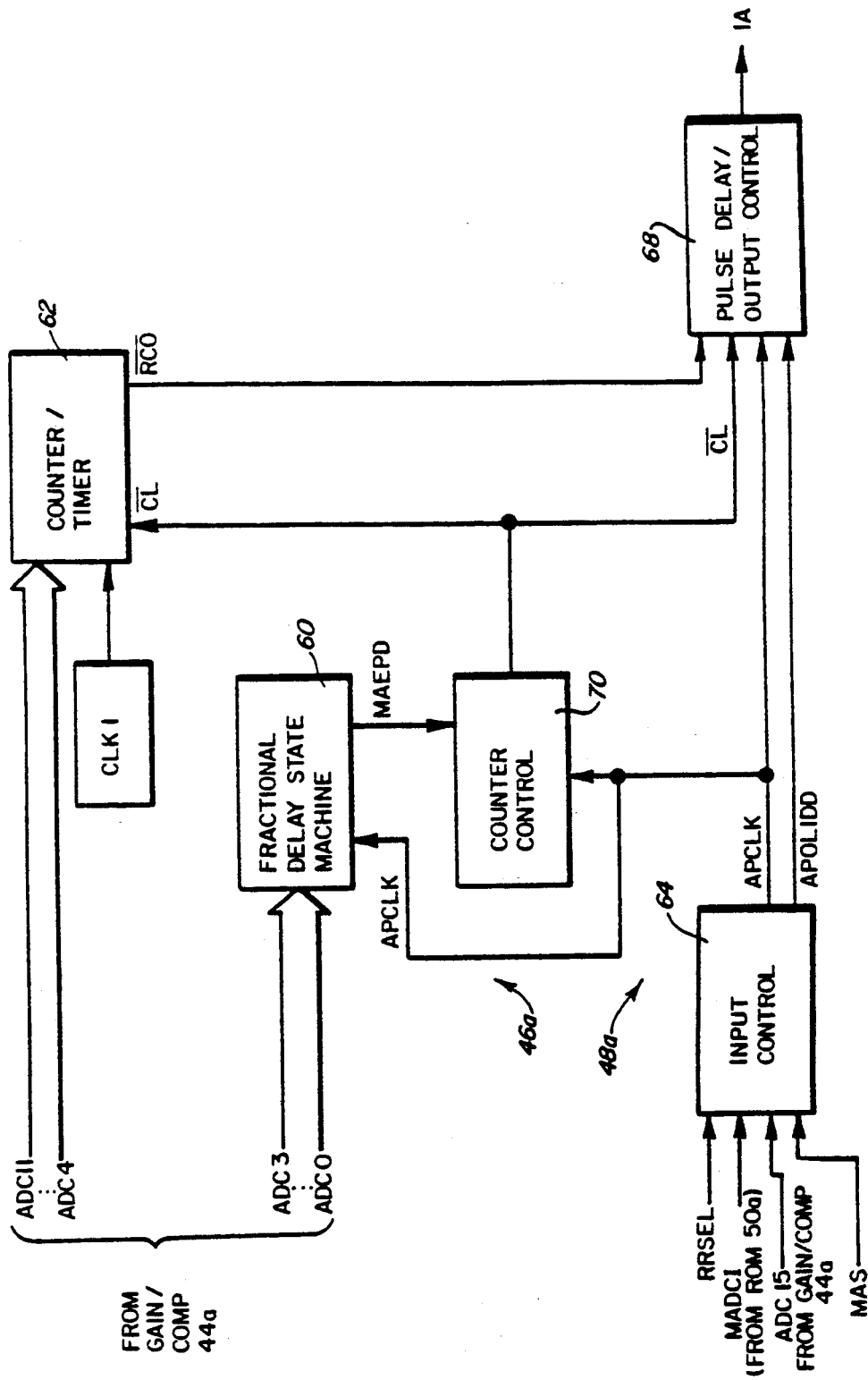
FIG. 8 is a block diagram of one of the edge select and edge delay circuits shown in FIG. 4.

In FIG. 8, there is illustrated in block diagram form one of the edge select circuits 46a–46c and edge delay circuits 48a–48c. Edge select circuit 46 receives 12 bits ADC0–ADC11 of the digital words developed by its corresponding gain and compensation unit 44 representing the required edge delay to correct for DC content in its associated inverter phase output. The bits ADC0–ADC3 are provided to fractional delay state machine 60 while the remaining bits ADC4–ADC11 are provided to counter/timer 62. The sixteenth bit ADC15 representing the polarity of the DC content in the inverter output is provided to input control 64 together with the bit stream, designated MADCI, obtained from associated memory 50. It should be noted that the bits ADC12–ADC14 are not used although they could be used with the bits ADC0–ADC11 to indicate the required correction with a higher resolution if desired.

Also provided to input control 64 is a signal RRSEL which is placed in a high state if the rail-to-rail converter topology shown in FIG. 2 is utilized or which is placed in a low state when a neutral point clamped inverter topology is used. A signal MAS developed by three-phase half cycle waveform generator 66, FIG. 4, is also provided to input control 64. Half cycle waveform generator 66 also develops half cycle waveforms for the other phases, designated MBS and MCS, which are identical to the waveform MAS except that they are displaced 120° and 240°, respectively, relative to such waveform.

Input control 64 develops two signals APCLK and APOLIDD which are provided to pulse delay/output control 68. Control 68 also receives inverted signal CL developed by counter control 70 and a counter inverter output signal RCO. Control 68 in turn develops the control signal 1A which is provided to the base drive and isolation circuits 32.

Counter control 70 is responsive to a signal MAEPD developed by fractional delay state machine 60 and the signal APCLK developed by input control 64. The signal APCLK is also provided to fractional delay state machine 60.

The inverted signal CL and the bits ADC4–ADC11 together control the amount of delay of the selected pulse edges in the PWM waveform to effect the coarse correction. The signal MAEPD determines which pulse edges are to be additionally delayed by a time equal to the width of pulses developed by clock CLK1 which is coupled to a clock input of counter/timer 62.

Figure 9:
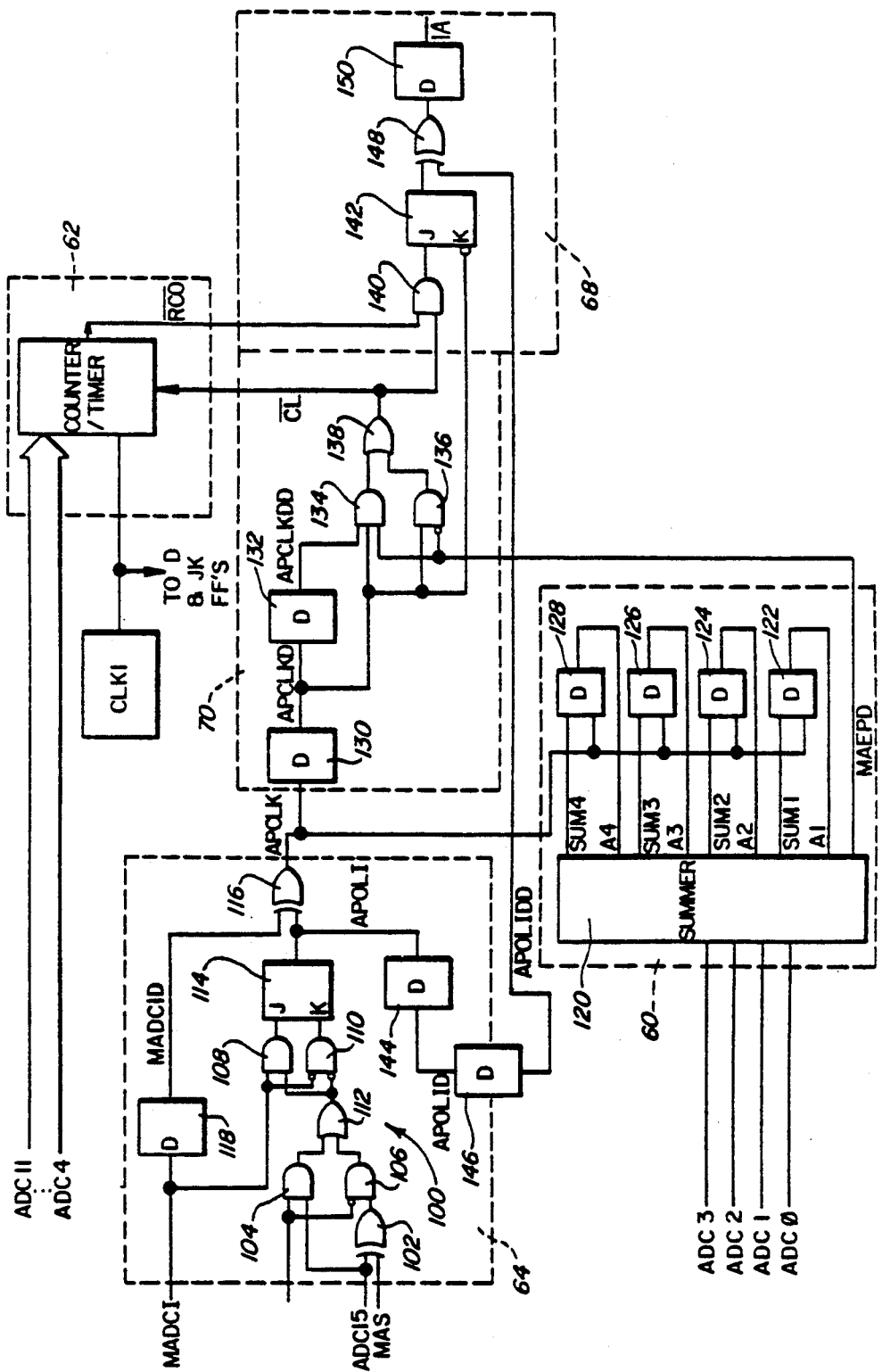
FIG. 9 is a schematic diagram showing the details of the edge select and edge delay circuit of FIG. 8.
Figure 10:
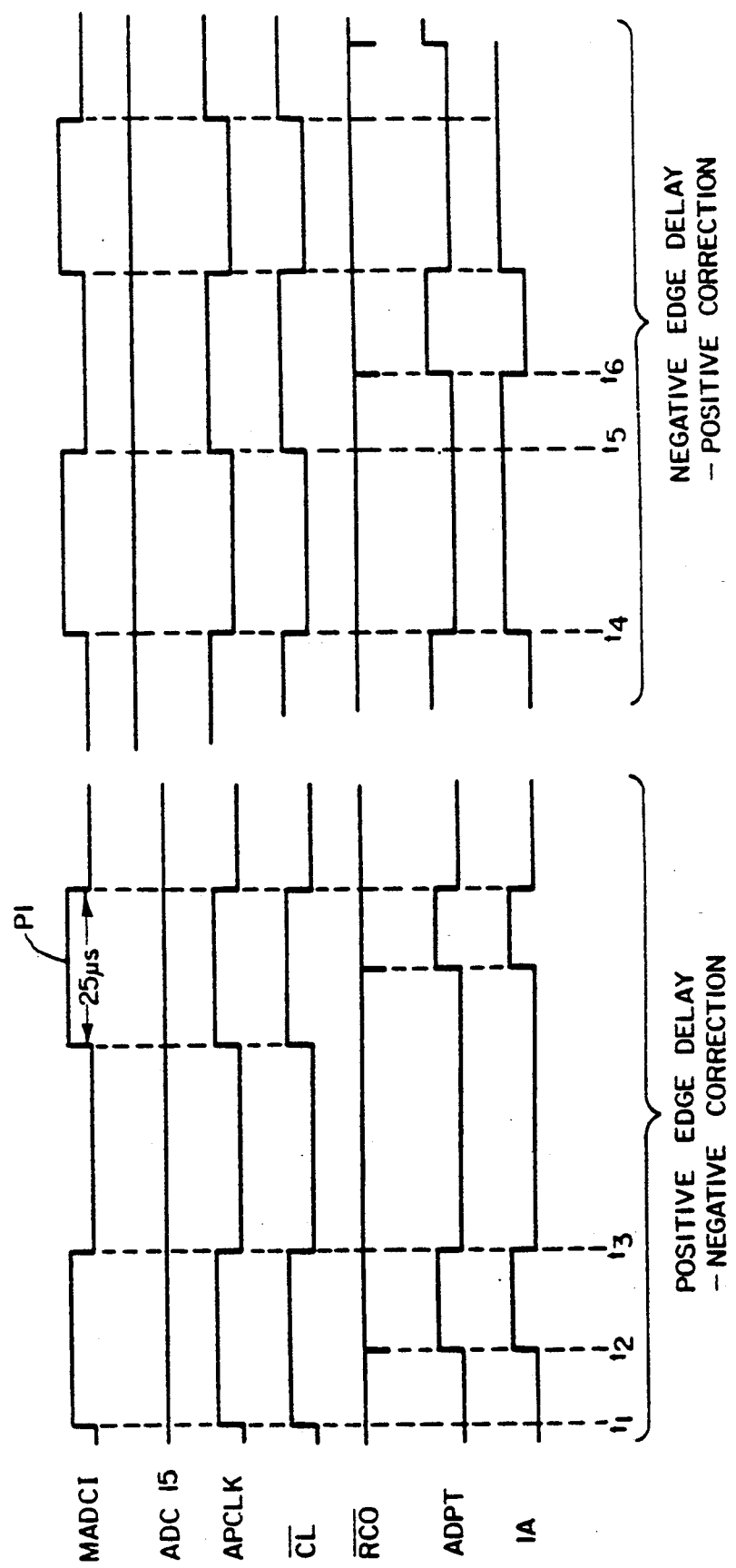
FIGS. 10-12 comprises a set of waveform diagrams illustrating the operation of the circuit shown in FIG. 9.
Figure 11:
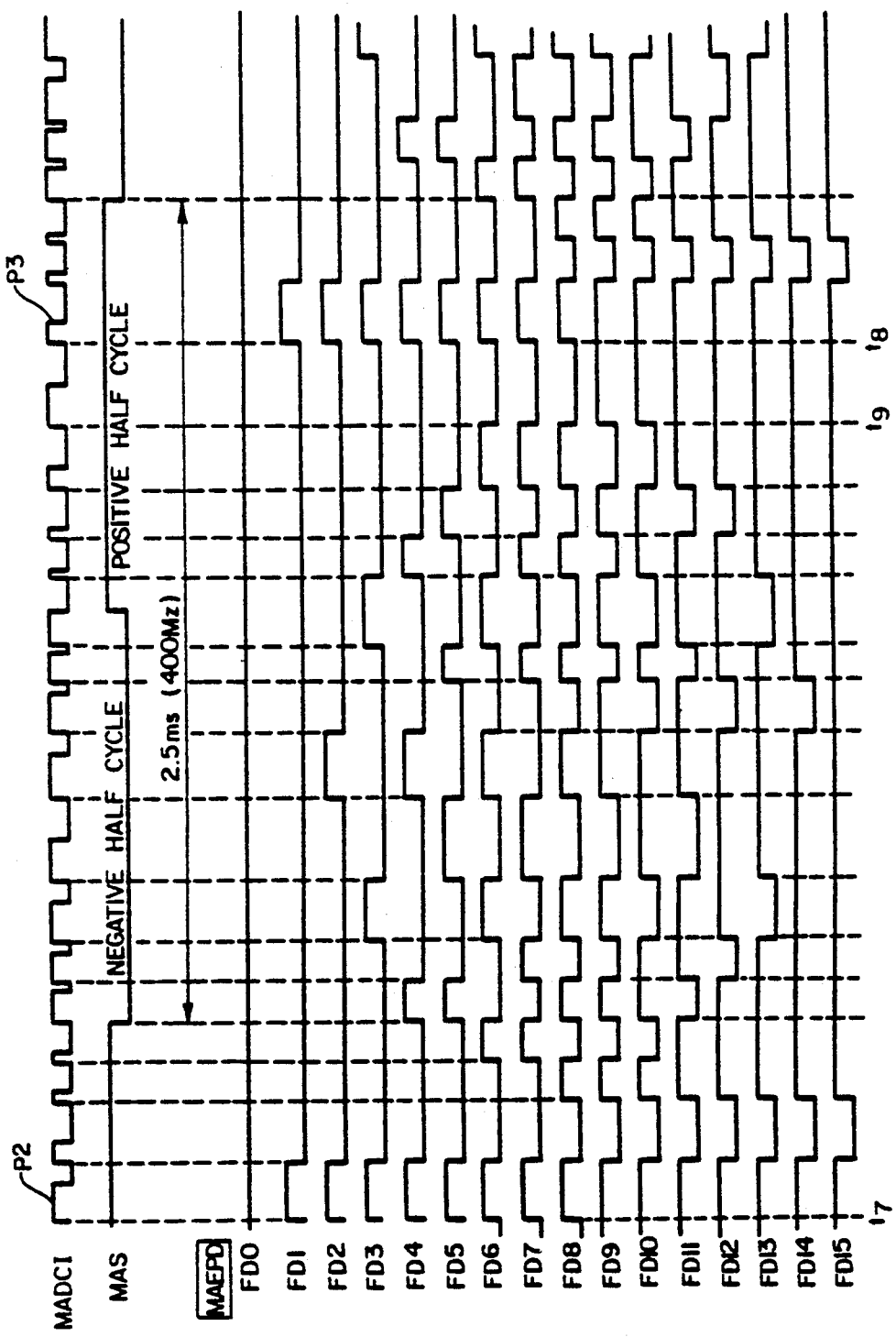
Figure 12:
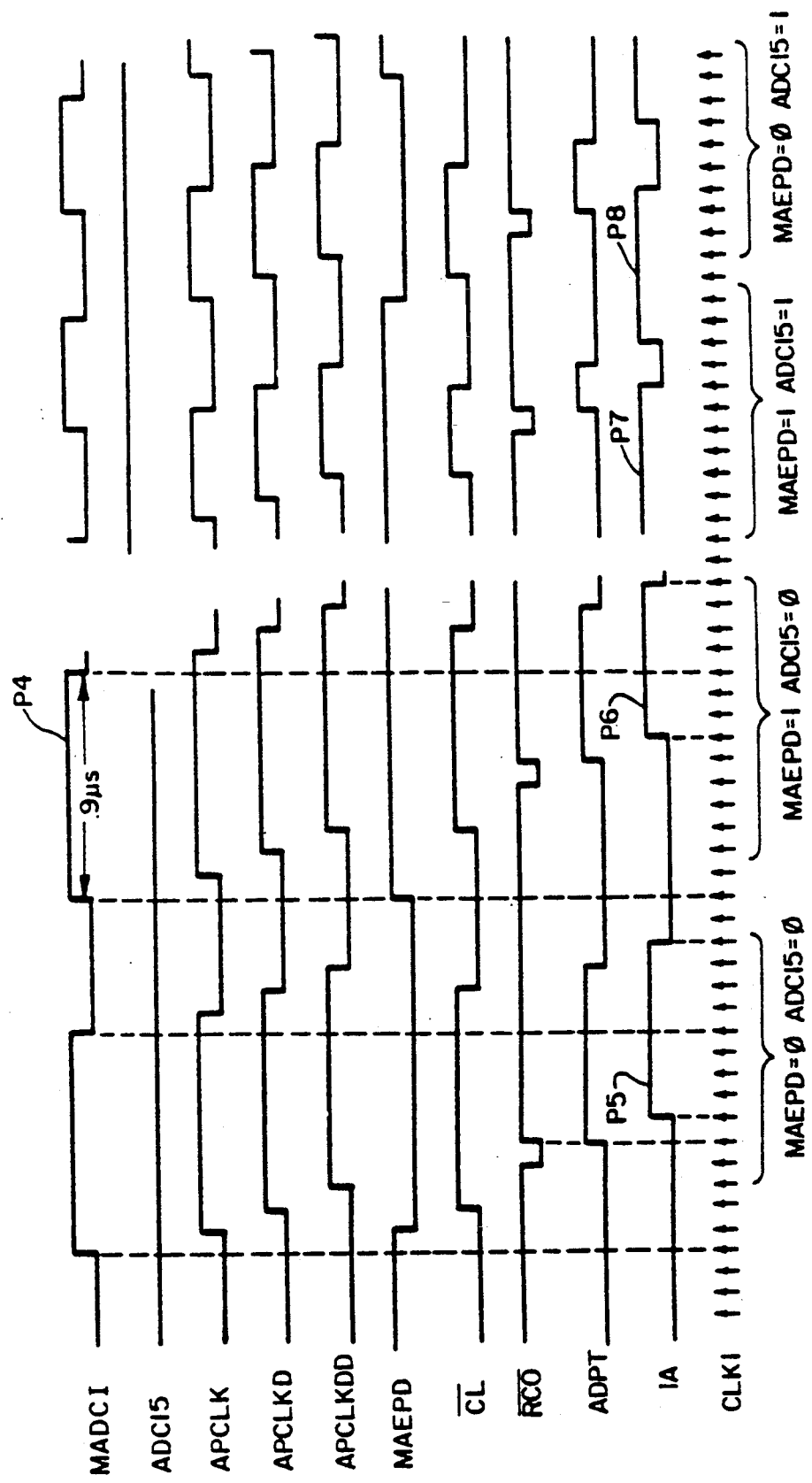

In FIG. 9, there is illustrated in greater detail the circuits shown in block diagram form in FIG. 8. The positions of the circuits in FIG. 9 have been altered slightly compared to FIG. 8 for clarity. Also, the circuits are shown for ease of understanding as being implemented in hardware which is responsive to and develops digital signals in the form of waveforms which can assume one of two states. Thus, for example, the digital bit stream obtained from the memories 50a–50c are represented in FIGS. 10–12 by the waveform MADCI. As noted above, however, some or all of the circuits of FIG. 9 may be implemented in software which is responsive to and develops digital signals in the form of digital words.

The bit stream signal MADCI, the rail-to-rail select signal RRSEL, the polarity bit ADC15 indicating the polarity of the DC content correction for the phase A inverter output and the half cycle wavefrom MAS are provided to logic network 100 comprising exclusive OR gate 102, AND gates 104, 106, 108, and 110, OR gate 112 and JK flip-flop 114. Logic circuit 100 develops a signal APOLI which is provided to one input of exclusive OR gate 116. A further input of exclusive OR gate 116 receives a delayed version MADCID of the signal MADCI as produced by D flip-flop 118. Exclusive OR gate 116 develops the signal APCLK which is provided to counter control 70 and to fractional delay state machine 60.

Fractional delay state machine 60 comprises digital parallel summer 120 which sums the bits ADC0–ADC3 obtained from gain and compensation unit 44 with the outputs of D flip-flops 122, 124, 126, and 128. The D flip-flops include clock inputs which receive the signal APCLK and further inputs which receive summation outputs SUM1, SUM2, SUM3, and SUM4 of the summer 120. The outputs of the D flip-flops are provided to summation inputs A1–A4. The parallel summer 120 includes a carry output at which the signal MAEPD is produced. This signal is provided together with signals APCLKD and APCLKDD produced by series connected D flip-flops 130 and 132 to a logic circuit comprising AND gates 134 and 136 and OR gate 138. The OR gate 138 develops the inverted signal CL which is provided to a counter start input of timer/counter 62. The inverted signal CL is also provided together with the inverted output RCO of counter/timer 62 to AND gate 140 having an output connected to one input of JK flip-flop 142. A further inverting input of JK flip-flop 142 receives the signal APCLKD. The output of the JK flip-flop 142 and a signal APOLIDD developed by D flip-flops 144 and 146 is provided to exclusive OR gate 148. The output of exclusive OR gate 148 is provided to D flip-flop 150 which in turn produces the control signal 1A.

It should be noted that all of the JK and D flip-flops, with the exception of the D flip-flops 122-128, are clocked by the clock CLK1 which operates at a frequency of approximately 9.8304 megahertz.

The operation in the circuit shown in FIG. 9 will now be described in conjunction with the waveform diagrams of FIGS. 10-12. FIG. 10 illustrates the coarse correction which is effected in accordance with the bits ADC4-ADC11 from gain and compensation unit 44. The scale of FIG. 10 is such that a pulse PI of the signal MADCI obtained from the memory 50 is approximately 25 microseconds in duration. The scale of FIG. 10, together with the frequency of the clock CLK1, renders the differences between the signals APCLK, APCLKD and APCLKDD not discernible in the FIGURE and hence only the signal APCLK is shown. Also, the state of the signal MAEPD does not affect the control signal 1A in a fashion which can be detected in FIG. 10 and hence this signal is not shown.

Assume that at a time t1 a rising edge of a pulse in the bit stream signal MADCI is received by D flip-flop 118 and AND gates 108 and 110 and that there is positive DC content in the associated inverter phase output. Such a signal combination results in generation of a pulse rising edge in the signals APCLK, APCLKD, and APCLKDD after short delays imposed by the D flip-flops 118, 130, and 132 Also at time t1, the inverted signal CL rises to a high state. This high state signal starts counter/timer 62 so that it decrements the value represented by the bits ADC4-ADC11 to zero as clock pulses are received from the clock CLK1. Once this value has been decremented to zero at a time t2, a narrow pulse is produced in counter/timer 62 output RCO, in turn causing the signal ADPT produced by JK flip-flop 142 to switch to a high state. This in turn causes the control signal output IA to also switch to a high state after a short delay imposed by D flip-flop 150.

At time t3, the signal MADCI obtained from the memory 50 switches to a low state. This, coupled with the fact that the bit ADC15 indicates that there is positive DC content in the inverter output causes the signals APCLK, APCLKD, and APCLKDD to similarly revert to a low state after the delays imposed by flip-flops 118, 130, and 132. Once the signal APCLKD switches to a low state, the output of AND gate 136 likewise switches to a low state, in turn causing the inverted signal CL, and hence the signals ADPT and 1A, to also switch to a low state.

It can be seen that the control, in the presence of positive DC content in the inverter output, narrows each control signal pulse. This narrowing, caused by delay of the rising edge from time t1 to time t2, results in the coarse correction noted above.

Assume that negative DC content is present in the inverter output and that rising and falling pulse edges, respectively, in the signal MADCI are received by the input control circuit 64 at times t4 and t5. The signal APCLK, and hence the signals APCLKD and APCLKDD, switch from high to low states shortly after the time t4 and revert to the high state shortly after the time t5. The inverted signal CL thus switches from a low to a high state substantially at the time t5, in turn causing counter/timer 62 to decrement the word represented by the bits ADC4-ADC11 to zero. Once this decrementing is complete, a narrow pulse is produced at the inverted output RCO at a time t6, in turn causing the signal ADPT to change to a high state. This has the effect of causing the control signal 1A to switch to a low state shortly after the time t6.

It can be seen that the falling edge of each pulse in the MADCI signal is delayed from the time t5 until approximately the time t6, in turn resulting in increased positive DC content in the inverter output to counteract the negative DC content.

In FIG. 11, there is illustrated a typical signal MADCI received from a memory 50 for the rail-to-rail topology illustrated in FIG. 2, together with the half cycle reference signal MAS and possible waveform states for the signal for the case where positive DC content is present in the inverter output MAEPD. These states, designated FD0-FD15, in turn determine which pulses in each cycle of the inverter phase output have edges which are to be delayed by a time equal to the duration of a clock pulse produced by the clock CLCK1. As seen in FIG. 11, each of the possible waveform states for the signal MAEPD, except the waveform FDO, comprises a series of pulses which include rising and falling edges coincident with rising edges of the pulses in the MADCI signal. If negative DC content were present in the inverter output, the rising and falling edges of the signal MAEPD would be coincident with falling edges of the pulses in the MADCI signal. As seen in the uppermost waveform, the number of pulses in each full cycle of the MADCI signal is equal to 15. However, each MAEPD waveform state FD1-FD15 repeats on a 16 pulse time base. Thus, each MAEPD waveform state will be in a high state at a different point in succeeding PWM cycles. For example, the FD1 waveform state for the signal MAEPD includes a pulse having a rising edge at a time t7 which is coincident with the rising edge of a pulse P2 in the positive half cycle of the MADCI signal. The pulse P2 happens to be the center pulse in a first positive half cycle of the MADCI waveform, although this need not be the case. The FD1 waveform state switches to a low state at the next rising edge in the MADCI signal and remains in a low state until a time t8, at which point the MAEPD signal again switches to a high state. This rising edge is coincident with a rising edge of a pulse P3 which is the next pulse after the center pulse in a second positive half cycle of the MADCI signal. Thus, it can be seen that over time the pulses having a selected pulse edge delayed by a clock pulse will be evenly distributed over the cycle.

Although not visible in FIG. 11 due to the scale of the waveforms, the rising and falling edges of the pulses in the MAEPD state waveforms are actually displaced by the width of a pulse from the clock CLK1 relative to the rising edges of the MADCI signal pulses. Further, the state waveforms are shown for the case where positive DC content is present in the inverter output and hence negative correction is necessary. In the event that negative DC content is present in the inverter output, the rising and falling edges in the state waveforms for the MAEPD signal occur at times displaced by the width of a clock pulse from the clock CLK1 from the falling edges of the pulses in the MADCI signal.

It can be seen that the high state portion of the waveform state FD1 is coincident with a signal pulse in a full cycle of the inverter output, for example, the pulse beginning at the time t7. Likewise, waveform states FD1-FD10 are in the high state at times coincident with 2-10 of the pulses in the MADCI signal, respectively, between the time t7 and a time t8. However, state waveforms FD11-FD15 are in a high state for 10-14 of the pulses, respectively, in the MADCI signal between these times.

FIG. 12 comprises a series of waveform diagrams illustrating the effect of the MAEPD signal for the example where such signal is in the FD8 state. The waveforms of FIG. 12 are drawn to a scale such that a pulse P4 in the PWM pulse pattern obtained from a memory 50 is 0.9 microseconds wide.

In the time scale of FIG. 12, the delays imposed by D flip-flops 118, 130, and 132 are evident so that the signals MADCI, APCLK, APCLKD, and APCLKDD can be distinguished. Also assumed in the waveforms of FIG. 12 is that the correction represented by the bits ADC4-ADC11 is such that a coarse correction delay of two clock pulses is imposed on the leading edge of a pulse P5 in the 1A waveform. During the time that the pulse P5 is being developed, the MAEPD signal is in a low state, thus resulting in no additional delay other than the two clock pulse delay imposed by counter/timer 62. However, during generation of a pulse P6, the signal MAEPD is in a high state. Hence, the two clock pule delay imposed by counter/timer 62 is increased by an additional clock pulse delay so that the width of the pulse P6 is further reduced due to delay of its leading edge by three clock pulses.

Pulses P7 and P8 illustrate the condition wherein negative DC content is present in the inverter output, and hence, the falling edges of the PWM waveforms are delayed. A pulse P7 is developed in the signal 1A which has a pulse width which is greater than the pulse width of the corresponding pulse in the MADCI waveform by three clock pulses. These three additional clock pulses are due to the coarse two clock pulse delay imposed by counter/timer 62 and the single clock pulse delay resulting from the signal MAEPD being in a high state. A next pulse P8 in the 1A output signal is wider than the corresponding pulse in the MADCI signal by two clock pulses since the MAEPD signal is in a low state.

While only one pair of the edge select and edge delay circuits for one phase have been described, it should be understood that the other two pairs of edge select and edge delay circuits for the other two phases are identical thereto and operate similarly.

From the foregoing, it can be seen that DC content in the inverter output is reduced and can be substantially eliminated using the control of the present invention.

It should be noted that the control of FIG. 4 can be modified in a straightforward fashion to prevent the control from modifying the pulses and notches in the PWM waveform beyond limits imposed by the response times of the switches of the inverter. Thus, for example, the control can be modified to prevent the pulses or notches from becoming too narrow which might lead to a fault condition. Such a modification could be implemented by a design which is readily apparent to one skilled in the art.

We claim:

1. An inverter arrangement for converting DC to AC comprising:
    first inverter means for inverting DC to AC, said first inverter means having an input for receiving DC and having first inverter output means for providing a first inverter output;
    second inverter means for inverting DC to AC, said second inverter means having an input for receiving DC and having second inverter output means for providing a second inverter output;
    AC output means for supplying said AC as a function of said first inverter output and said second inverter output, said AC output means having a first input connected to said first inverter output means, a second input connected to said second inverter output means, and an AC output; and,
    controller means connected to said first inverter means and to said second inverter means for controlling said second inverter means so as to minimize DC content between said first inverter output and said second inverter output.

2. The inverter arrangement of claim 1 wherein said first inverter means comprises at least first means for supplying a first output having a first phase and second means for supplying a second output having a second phase, wherein said second inverter means comprises at least first means for supplying a first output having a first phase and second means for supplying a second output having a second phase, and wherein said controller means comprises DC content sensing means for sensing a first DC content between said first output of said first means and said first output of said second means and for sensing a second DC content between said second output of said first means and said second output of said second means, said controller means for controlling said second inverter means so as to minimize said first and second DC content.

3. The inverter arrangement of claim 2 wherein said AC output means comprises first phase-forming means connected to said first means of said first inverter means for receiving said first output of said first inverter means and to said first means of said second inverter means for receiving said first output of said second inverter means, said first phase-forming means having first phase output means further for supplying AC having a first phase, and wherein said AC output means comprises second phase-forming means connected to said second means of said first inverter means for receiving said second output of said first inverter means and to said second means of said second inverter means for receiving said second output of said second inverter means, said second phase-forming means having second phase output means for supplying AC having a second phase.

4. The inverter arrangement of claim 3 wherein said AC output means further comprises neutral forming means connected to said phase forming means for providing a neutral phase in said AC.

5. An inverter arrangement for converting DC to AC comprising:
    first inverter means for inverting DC to AC, said first inverter means having an input for receiving DC and having first inverter output means for providing a first inverter output;

second inverter means for inverting DC to AC, said second inverter means having an input for receiving DC and having second inverter output means for providing a second inverter output;

AC output means for supplying said AC as a function of said first inverter output and said second inverter output, said DC output means having a first input connected to said first inverter output means, a second input connected to said second inverter output means, and an AC output; and, controller means connected to said AC output and to said first inverter means for controlling said first inverter means so as to minimize DC content in said AC output, said controller means further being connected to said first inverter output means, to said second inverter output means, and to said second inverter means so as to minimize DC content between said first inverter output and said second inverter output.

6. The inverter arrangement of claim 5 wherein said first inverter output means comprises at least first means for supplying a first output having a first phase and second means for supplying a second output having a second phase and wherein said second inverter output means comprises at least first means for supplying a first output having a first phase and second means for supplying a second output having a second phase.

7. The inverter arrangement of claim 6 wherein said controller means is connected to said second inverter means, to said first means of said first inverter output means, and to said first means of said second inverter output means for controlling said second inverter means so as to minimize a difference in DC content between said first output of said first inverter means and said first output of said second inverter means and wherein said controller means is further connected to said second means of said first inverter output means and to said second means of said second inverter output means for controlling said second inverter means so as to minimize a difference in DC content between said second output of said first inverter means and said second output of said second inverter means.

8. The inverter arrangement of claim 6 wherein said AC output means comprises first phase-forming means connected to said first means of said first inverter means and to said first means of said second inverter means for receiving said first outputs of said first and second inverter means, said first phase-forming means having a first phase AC output means for supplying a first phase AC output having a first phase, and said AC output means comprises second phase-forming means connected to said second means of said first inverter means and to said second means of said second inverter means for receiving said second outputs of said first and second inverter means, said second phase-forming means having a second phase AC output means for supplying a second phase AC output having a second phase.

9. The inverter arrangement of claim 8 wherein said AC output means further comprises neutral forming means, connected to said phase forming means, for providing in said AC a neutral phase output having neutral phase.

10. The inverter arrangement of claim 9 wherein said controller means is connected to said first phase AC output means and to said neutral forming means for minimizing DC content in said first output of said first inverter means based upon a difference in DC content between said first phase AC output and said neutral phase output and wherein said controller means is further connected to said second phase AC output means and to said neutral forming means for minimizing DC content in said second output of said first inverter means based upon a difference in DC content between said second phase AC output and said neutral phase output.

11. The inverter arrangement of claim 10 wherein said controller means is connected to said second inverter means, to said first means of said first inverter output means, and to said first means of said second inverter output means for controlling said second inverter means so as to minimize a difference in DC content between said first output of said first inverter means and said first output of said second inverter means and wherein said controller means is further connected to said second means of said first inverter output means and to said second means of said second inverter output means for controlling said second inverter means so as to minimize a difference in DC content between said second output of said first inverter means and said second output of said second inverter means.

12. A method for converting DC to AC comprising the following steps:
combining a first inverter output and a second inverter output to provide AC;
sensing DC content in said AC;
controlling a first inverter based upon said DC content in said AC so that DC content in said AC is minimized;
sensing DC content between said first inverter output and said second inverter output; and,
controlling a second inverter based upon said DC content between said first inverter output and second inverter output so that DC content between said first inverter output and said second inverter output is minimized.

13. The method of claim 12 wherein said step of combining a first inverter output and a second inverter output comprises the steps of combining at least a first phase first inverter output and a first phase second inverter output for providing a first phase AC output and of combining a second phase first inverter output and a second phase second inverter output for providing a second phase AC output.

14. The method of claim 13 wherein said step of sensing DC content between said first inverter output and said second inverter output comprises the steps of sensing the difference in DC content between said first phase first inverter output and said first phase second inverter output and sensing the difference in DC content between said second phase first inverter output and said second phase second inverter output and said step of controlling said second inverter comprises the step of controlling the second inverter to minimize the difference in DC content between said first phase first inverter output and said first phase second inverter output and to minimize the difference in DC content between said second phase first inverter output and said second phase second inverter output.

15. The method of claim 13 wherein said step of combining a first inverter output and a second inverter output comprises the step of forming a neutral phase for said AC output.

16. The inverter arrangement of claim 15 wherein said step of sensing DC content in said AC comprises the steps of sensing a difference in DC content between said first phase AC output and said neutral phase and sensing the difference in DC content between said second phase AC output and said neutral phase and said step of controlling said first inverter comprises the step of controlling the first inverter to minimize the difference in DC content between said first phase AC output and said neutral phase and to minimize the difference in DC content between said second phase AC output and said neutral phase.

17. The method of claim 16 wherein said step of sensing DC content between said first inverter output and said second inverter output comprises the steps of sensing the difference in DC content between said first phase first inverter output and said first phase second inverter output and sensing the difference in DC content between said second phase first inverter output and said second phase second inverter output and said step of controlling said second inverter comprises the further steps of controlling the second inverter to minimize DC content in said first phase second inverter output based upon the difference in DC content between said first phase first inverter output and said first phase second inverter output and to minimize DC content in said second phase second inverter output based upon the difference in DC content between said second phase first inverter output and said second phase second inverter output.

* * * * *